United States Patent [19]

Beller

[11] Patent Number: 4,649,599
[45] Date of Patent: Mar. 17, 1987

[54] HOOD HINGE ASSEMBLY FOR OUTDOOR COOKING DEVICE

[75] Inventor: Frank W. Beller, Aurora, Ill.
[73] Assignee: Belson Manufacturing Co., Inc., Chicago, Ill.
[21] Appl. No.: 764,218
[22] Filed: Aug. 9, 1985
[51] Int. Cl.⁴ .................. E05D 11/10; E05D 11/16
[52] U.S. Cl. .................................. 16/332; 16/319; 16/345; 16/348; 16/357
[58] Field of Search .............. 16/332, 327, 321, 319, 16/356, 355, 343, 344, 348, 349, 357, 358; 49/50, 231, 374

[56] References Cited

U.S. PATENT DOCUMENTS 1,303,441  5/1919  Wilton ............................ 16/348

Primary Examiner—Frederick R. Schmidt
Assistant Examiner—Maurina Rachuba
Attorney, Agent, or Firm—Lee, Smith & Zickert

[57] ABSTRACT

A hinge assembly for the hood of an outdoor cooking device provides for the pivoting adjustment of the hood from a closed to an open position. The hinge assembly includes two separable leaf members facilitating the removal of said hood from said cooking device. One leaf is movable and is affixed to the back of the hood. The other is affixed to the back wall of the cooking device and includes an open slot means having a continuous edge formed with three pocket portions for the pivotal cooperation with two pivot pins associating with the movable hinge leaf. The movable hinge leaf has two parallel plates which are spaced apart at a sufficient distance to straddle the fixed hinge leaf in close tolerance. The hinge assembly is capable of holding said hood open with the center of gravity at an inclination to vertical, whereby said pivot pins are sequentially pivotable in two of said pocket portions during movement between the open and closed position.

14 Claims, 8 Drawing Figures

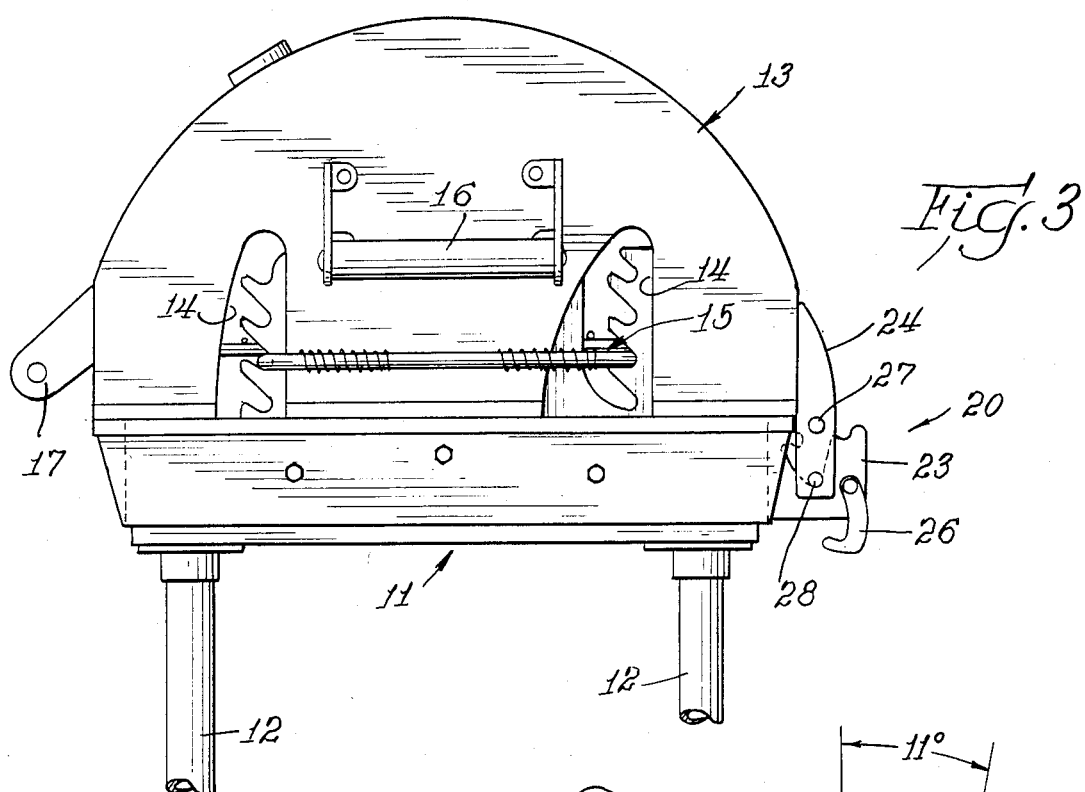
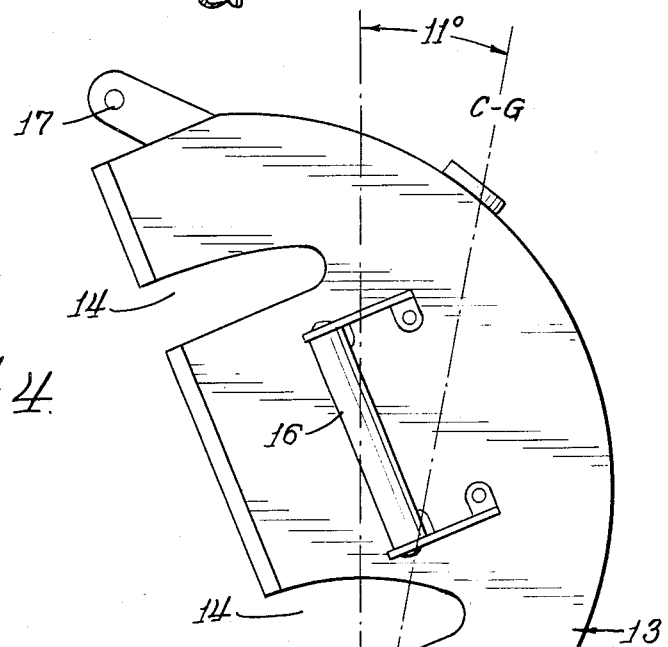
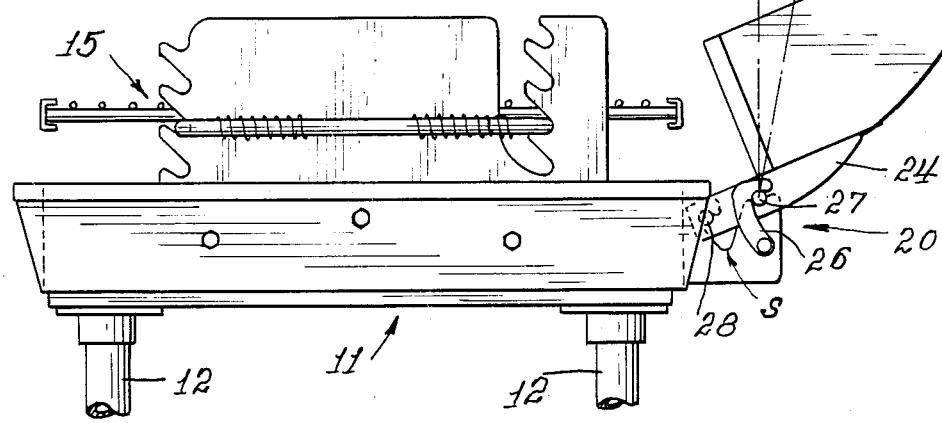

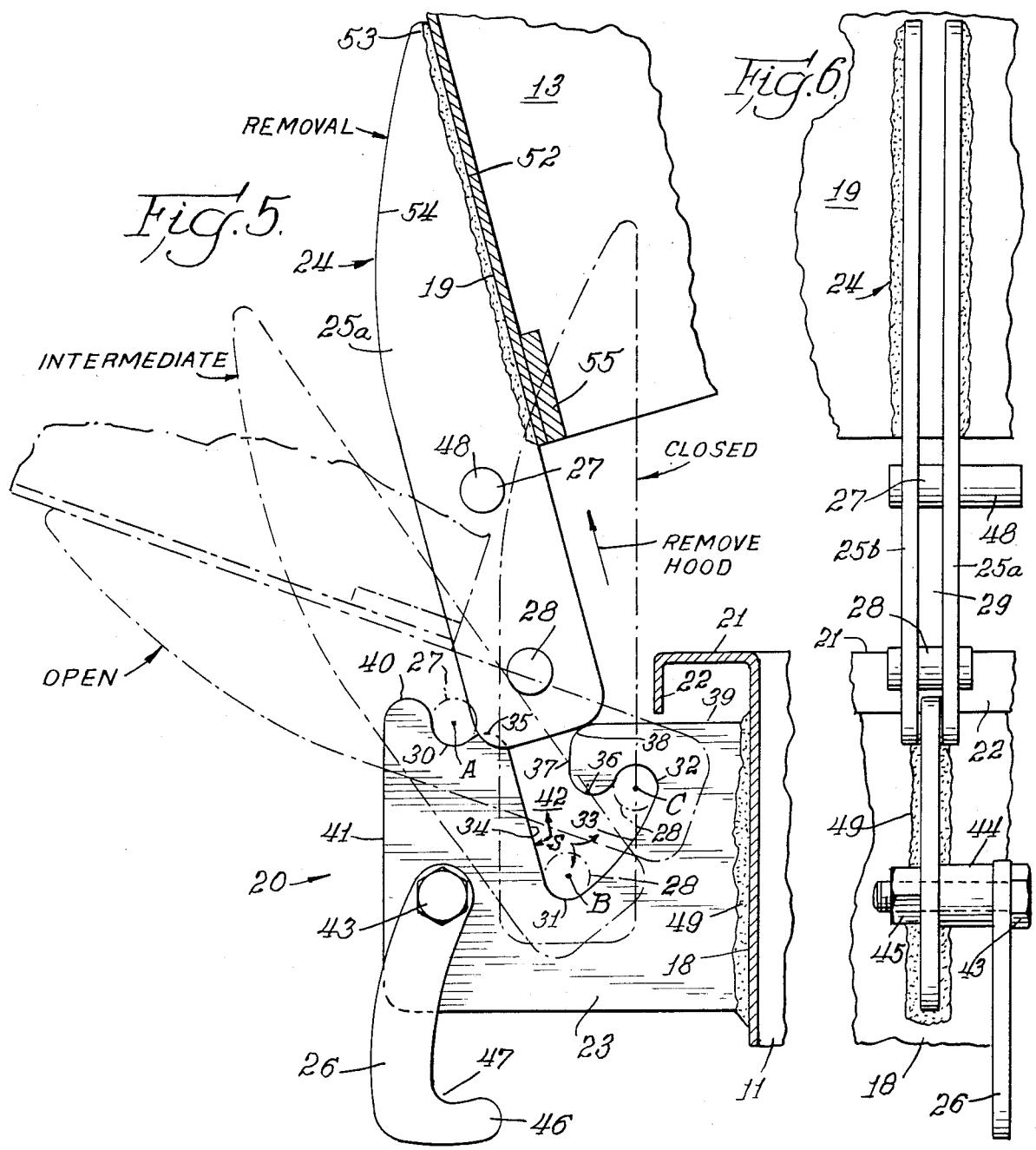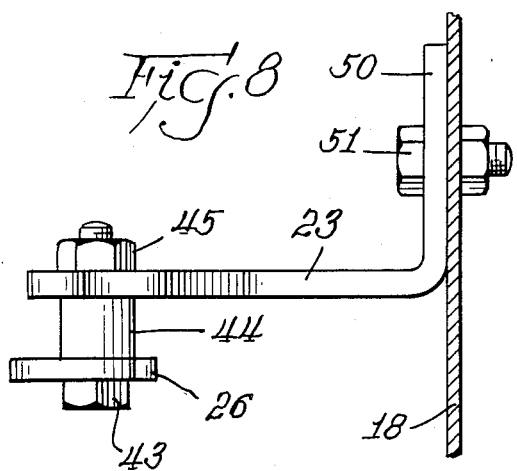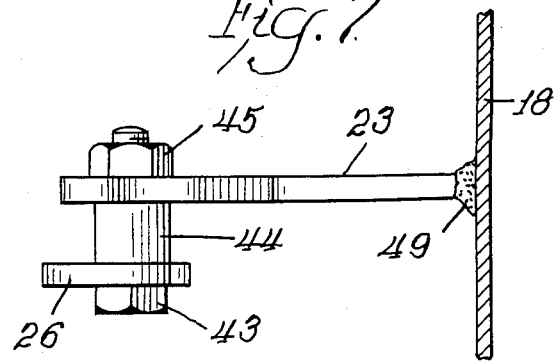

HOOD HINGE ASSEMBLY FOR OUTDOOR COOKING DEVICE

BACKGROUND AND SUMMARY OF THE INVENTION

The invention is directed toward a hinge assembly for a hood or lid covering an outdoor cooking device, such as a roasting oven, rotisserie, smoker or grill.

Large volume outdoor cooking devices are commonly employed at picnics and other social gatherings when a great number of portions of food are to be prepared. One such cooking device is shown in U.S. Pat. No. 4,442,762, issued Apr. 17, 1984, to the present inventor. The meat roaster shown therein provides a firebox and means for supporting charcoal, and the like, below a removable spit basket, rotisserie or grill. When necessary, a lid is utilized to cover the items while they are being cooked. As shown in said patent, one previous technique for pivotably supporting the lid is by means of piano-type hinges affixed between the lid and the back wall of the firebox. Support rods have been utilized to stabilize the lid when open, as well as the provision of locking arm means for maintaining the lid in the open position so that the cook may inspect the food.

Other outdoor cooking ovens have also utilized unhinged lids, which simply provide handles at opposite sides of the lid so that the lid may be lifted onto or from the device.

As will be clear, such oven lids are necessarily constructed of sturdy and heat resistant metal, such as 12 to 16 gauge steel. These lids are therefore relatively heavy and, if pivotable, require a very secure and strong hinge.

Although piano-type hinges provide for the pivoting of a lid, they do not allow for the removability of the lid from the cooking device when such might be desired.

It would be very desirable to provide a hinge assembly for a lid that allows the lid to be both removable and also capable of being securely supported in the open position while the chef is otherwise involved in the preparation of the food items.

It is also a goal to provide a hinge assembly that permits one individual to easily open and close the lid without great effort even though the lid may weigh up to one hundred pounds or more.

It is also an object of the invention to provide a hinge assembly that utilizes two pivot pins to achieve sequential pivoting at each for a controlled motion into and out of the closed arrangement over the cooking device.

It is further desirable to provide a latching means for securing the hinge assembly, and thereby the lid, in the open position.

A further objective is to provide a hinge assembly that has a fixed hinge leaf secured to the firebox and a double-plate movable hinge leaf secured to the hood, wherein the fixed and movable leaves are fully separable in a facile upward motion.

In satifying these goals, it would also be of great benefit to provide a sturdy but relatively inexpensive hinge assembly that does not require any other locking or guiding means between the lid and the oven.

It is also a concomitant goal to simply provide two hinge assemblies at spaced-apart locations on the back of the oven and lid in order to reduce the manufacturing cost, weight and bulkiness of the cooking device.

The foregoing objects and goals are satisified by the provision of a hinge assembly which comprises a pair of parallel plates forming a movable hinge leaf wherein the plates are interconnected by two spaced-apart pivot pins extending therethrough. The movable hinge leaf is attached to the hood of the oven. The pivot pins being cooperative with a single-plate fixed hinge leaf which is secured to the back of the oven fire wall. The fixed hinge leaf includes an open slot means that is formed to provide three pocket portions, referenced A, B and C, and connected by a continuous slot edge, which provide for the selective engagement of the pivot pins. Two of the pockets, A and B, are concave upwardly and the other, C, is concave downwardly. The centers of the pockets form an imaginary isosceles triangle and a lower pivot pin of the movable hinge leaf is movable along an arcuate portion of said continuous slot edge between two of the pockets, B and C, which are located at the corners of the base leg of the isosceles triangle. The arcuate portion of the slot edge has a radius centered at the center of pocket A. The pocket A is located at the apex of the isosceles triangle. Said pivot pins each being pivotable in sequence at each of said concave upward pockets A and B. The concave downward pocket C is a pivot stop for the lower pivot pin when the lid is in the open position.

The pivot pockets A and B, in which the pivot pins rotate, are joined by a straight edge tangential portion of the slot means which creates a slide for the lower pivot pin and defines, in part, an upwardly open passage of said slot means whereby the lower pivot pin may be slid outwardly of the slot means in order to disengage the movable hinge leaf, and thereby the hood, from the fixed hinge leaf. The hood includes front and side handle means facilitating the pivoting and removal of the hood. Said hinge plates, which form the movable hinge leaf, provide a spacing therebetween whereby to pass on opposite sides of the fixed hinge leaf during rotation of the pivot pins and are preferably spaced only so far as to allow for clearance with the fixed hinge leaf so to thereby also provide lateral rigidity to the hinge assembly.

The fixed hinge leaf optionally includes a pivoting latch arm having a hooked end rotatable in an arc, whereby to engage the upper pivot pin when the hood is in the open position. The upper pivot pin has an extended length to be longer than the other, whereby to project outwardly of the pair of plates in order to enable engagement with the latch arm sidewardly of the pair of plates forming the movable hinge leaf.

BRIEF DESCRIPTION OF THE DRAWING

FIG. 3 is side elevational view of one of the hinge assemblies associating with the lid in the closed position over the firebox as shown in FIG. 1;

FIG. 4 is a side elevational view as shown in FIG. 3 but wherein the lid is in the opened position;

FIG. 5 is a side view of the hinge assembly and a portion of the lid as shown in FIG. 3 wherein the fixed hinge leaf is welded to the firebox, and illustrating the movable hinge leaf in the process of being removed from the fixed hinge leaf; and in phantom, showing the movable hinge leaf in an open, intermediate and closed position;

FIG. 6 is a rear view of the hinge assembly shown in FIG. 5, looking from the left-hand side thereof;

FIG. 7 is a top view of the fixed hinge leaf as shown in FIG. 5;

FIG. 8 is top view of the fixed hinge leaf having a bent flange portion bolted to the firebox as shown in FIG. 3.

DETAILED DESCRIPTION OF THE PREFERRED EMBODIMENT

Figure 1:
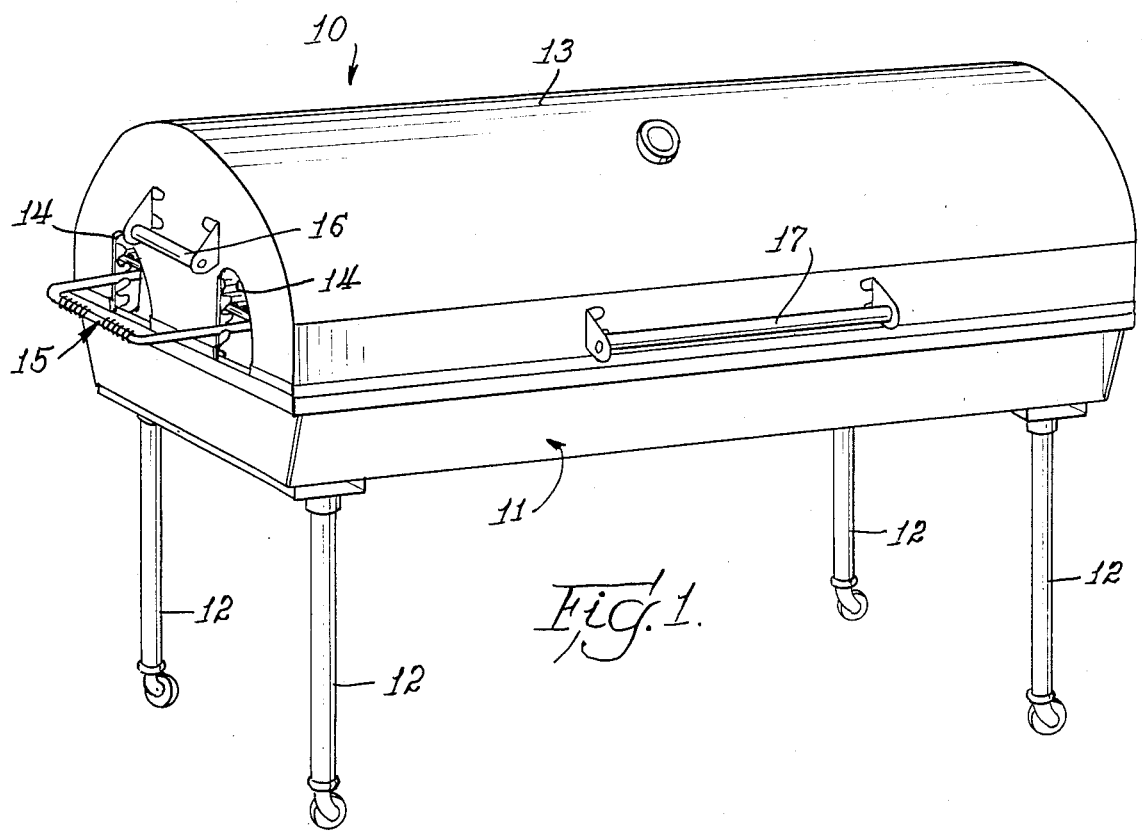
FIG. 1 is a perspective view of an outdoor cooking device having a dome-shaped lid resting atop a firebox.
Figure 2:
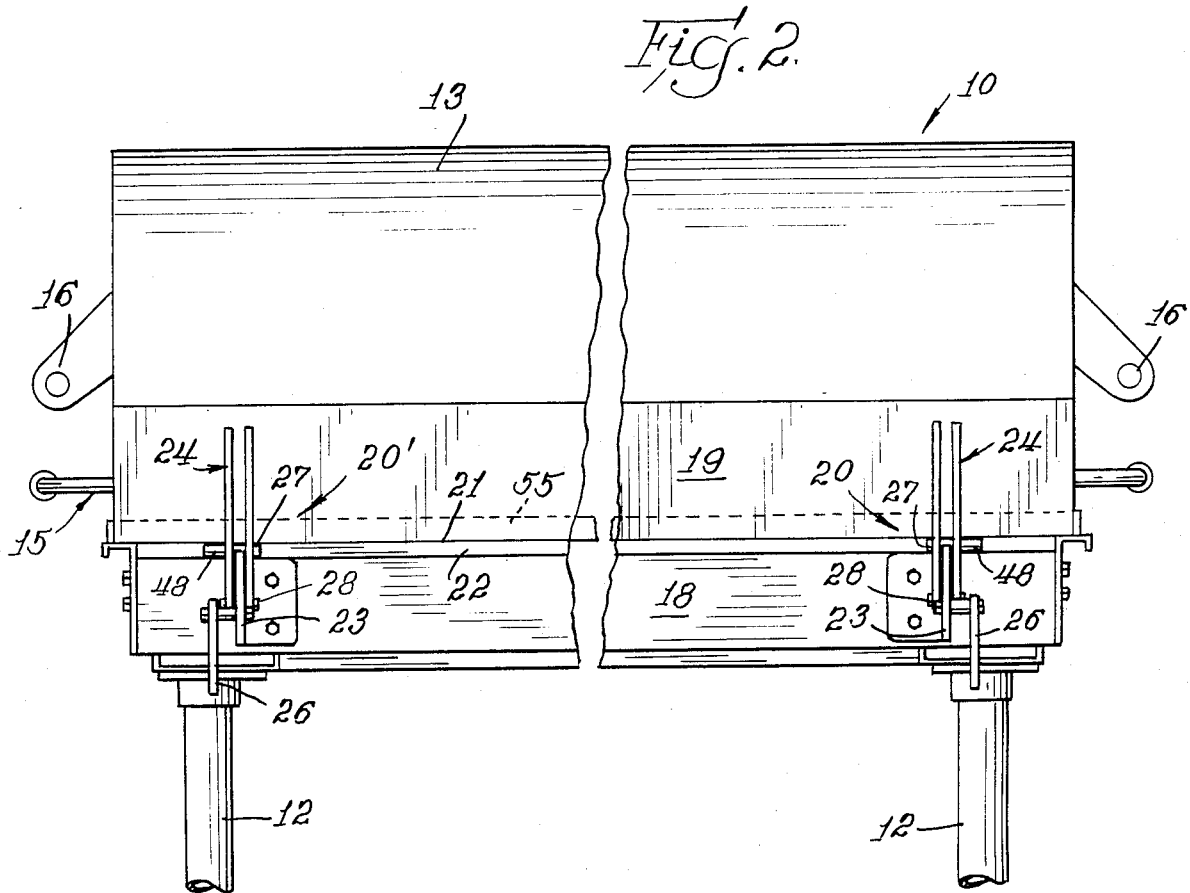
FIG. 2 is a rear elevational view of the firebox and lid in association with two hinged assemblies in accordance with the invention, wherein a fixed hinge leaf is bolted to the firebox.

An exemplary outdoor cooking device is shown in FIGS. 1-4 for utilization of the inventive hinge assembly. The outdoor cooking device 10 includes a rectangular firebox 11 that is suppported by legs 12. Covering the firebox 13 is a hood 13 having a dome-shaped such as shown in the previously mentioned U.S. Pat. No. 4,442,762. The sides of the hood 13 include access cutouts 14 facilitating adjustment of a grill assembly 15 arranged over the firebox 11, which forms no part of the present invention. Also at the sides of the hood 13 are handles 16 to facilitate lifting and pivoting the hood 13, as will be hereinafter described. A front handle 17, best illustrated in FIG. 1, also may be used for moving the hood 13 upwardly and downwardly with respect to the grill assembly 15 and the fire box 11. In FIG. 2, the rear of the cooking device 10 is shown wherein the back wall of the firebox 11 bears the reference numeral 18. The lower back side of the hood 13 includes a flat wall 19 to which the hinge assemblies 20 and 20' of the invention are affixed. The hinge assemblies 20 and 20' are identical mirror images, as would be understood. FIG. 3 shows the right side of the cooking device 10 illustrating the hinge assembly 20 in the closed position wherein the hood 13 is closed atop the firebox 11. FIG. 4 shows the same view, but with the hood 13 in a locked open position at hinge assembly 20 and wherein the center of gravity of the hood 13 is 11° past vertical with respect to a line passing through a pivot point at hinge assembly 20 and the center of gravity of the hood 13.

FIG. 5 is a detailed illustration of the hinge assembly 20 and a cross section of the back wall 18. Wall 18 is of a conventional design having an upper horizontal flange and a depending flange 22 for rigidity. The hinge assembly 20 is comprised of two basic components which are a fixed hinge leaf 23 and a movable hinge leaf 24 formed by a spaced-apart pair of parallel plates 25a and 25b. The hinge leaf 23 is affixed to the firebox 18 by welding, rather than by bolting as shown in FIG. 8, which is an alternate attachment means as explained hereinafter. An optional latch arm 26 may be provided to secure the movable leaf 24 in the open position.

Best viewed in FIG. 6, the plates 25a and 25b forming leaf 24 are spaced apart a distance substantially the same as the thickness of the fixed hinge leaf 23 and are interconnected by welded equi-radius pivot pins 27 and 28 extending therethrough. Thereby, a space 29 extends between the parallel plates 25a and 25b for the accommodation of the leaf 23. It will be observed that straddling-type constraint by plates 25a and 25b on leaf 23 is achieved, which adds lateral strength and rigidity when the hood 13 is in the open position as shown in FIG. 5.

The fixed leaf 23 of the exemplary embodiment is generally rectangular in overall shape but is cut out generally through the upper middle portion thereof to provide a continuous-edged upwardly open slot means S having a pivot and latch pin pocket 30, a lower pivot pin pocket 31, and an upper pivot pin pocket 32. The pockets have radii equal to the radii of pivot pins 27 and 28. At this point it will be observed that, in phantom lines, the movable hinge leaf 24 is shown in the open, intermediate and closed positions in FIG. 5, which will be explained in detail in the following. In solid lines, the movable hinge leaf 24 and the hood 13 are shown during removal from fixed leaf 23, such as might be required when cooking procedures are finished, and the cooking device 10 requires cleaning, or when the chef has no need for the oven-type effect caused by the hood 13.

As illustrated in FIG. 5, the centers of the pockets 30, 31 and 32 are denoted by the letters A, B and C, respectively. These A, B and C points define an imaginary isosceles triangle wherein leg A-B is equal to leg A-C. The distance A-B is substantially the same as the center-to-center distance of the pivot pins 27 and 28. The pockets 31 and 32 are joined by arcuate edge portion 33 having point A as its center, and a radius equal to the dimension A-B, plus the radius of the pivot pin 28. Arcuate edge 33 provides a curved traveling surface between the two pockets 31 and 32 for the lower pivot pin 28 as shown. Continuing upwardly from the other side of the pocket 31, a tangential straight edge portion 34 extends to a radiused portion 35 which returns the continuous edge of slot means S in a reverse curve to the radiused pocket 30. At a point generally diametrically opposite the juncture with arcuate edge 33, the pocket 32 is joined in a reverse curve to radiused return portion 36 which terminates to be tangential with a vertical slot edge 37. Edge 37 is tangent at its opposite end to a radiused return 38 which brings the continuous edge of slot means S back to a straight upper horizontal edge 39 of the leaf 23. At the other side of the leaf 23, the pocket 30 meets in a reverse curve with radiused edge return 40 which curves to be tangent to an outward vertical edge 41 of the hinge leaf 23 and thus defines the end of the continuous edge of slot means S. Thereby, between the return 38 and return 40, a continuous slot edge is provided for cooperation with the pivot pins 27 and 28. A space 42 is created between the straight edge 34 and generally vertical edge 37 of sufficient width to permit the pivot pin 28 to pass therethrough into the removed orientation as shown in solid lines.

In operation, the movement of the pivot pins 27 and 28, and motion of the movable hinge leaf 24, may best be described with first reference to the closed position shown in FIG. 5. In that disposition, the pivot pin 28 nests within the pocket 31 and the pivot pin 27 is vertically arranged thereabove in close, but not necessarily resting, relationship with the upper edge 39 of the fixed hinge leaf 23. The hood 13 is thereby rested upon the upper flanges of the walls of the firebox 11. For example, it will be understood that the flange 21 of the wall 18, being reinforced by vertical flange 22, supports the hood 13 therealong.

When it is desirable to remove the hood 13 from the firebox 11, such as to inspect the food items cooking on the grill assembly 15, the cook may grasp the front handle 17 and push upwardly to pivot the pin 28 within the pocket 31. As the hood 13 is being pivoted, the pin 27 moves in an arc about the center B until contact with the pocket 30. Then, the pins 27 and 28 may be said to both be momentarily pivotably arranged in pockets 30 and 31, respectively. This results in the intermediate position shown in FIG. 5. At that point, the chef may choose to re-close the hood 13, or may continue to move the hood 13 into the open position. If the latter is chosen, the pin 27 becomes a sequential pivot point within the pocket 30 whereby the pin 28 moves upwardly generally along the arcuate edge 33 in a path that brings it into nesting contact with the downwardly concave pocket 32, which therefore acts as a pivot stop, as shown by the open position of FIG. 5. At the open orientation, the weight of the hood 13 pivots the hinge leaf 24 counterclockwise as shown in FIG. 5, so that the pin 28 provides a generally vertical force against pocket 32 to be held therein while pivot pin 27 is the fulcrum and rests on the pocket 30. In the open position, the center of gravity of the hood 13 is, in preferred form, about 11° past vertical so that the hood 13 is held in a stable and secure position, while at the same being sufficiently open to grant access to the food items resting the grill assembly 15. The relationships of the centers A, B and C may be changed as explained hereinafter, so that the center of gravity may be positioned in different inclinations with respect to vertical. It would be understood, however, that in order for the hood 13 to remain open, the center of gravity would necessarily be required to be at least somewhat past vertical, so that it does not precariously teeter and run the risk of an accidental pivoting closure of the hood 13, such as might result from a gust of wind. The hinge assemblies 20 and 20' may also be formed to place the center of gravity at greater than an 11° inclination from vertical. However it will be appreciated that the farther the center is inclined from vertical, the further the hood 13 will project backwardly from the cooking device 10 and require more cooking space. Also, the greater the inclination the further that the handle 17 will be spaced away from the front of the grill and may become difficult to reach by the chef. While the handles 16 may be conveniently utilized by persons stationed at each end of the firebox, it would be desirable to have the option of permitting a single individual to open and close the hood 13.

The preferable way to achieve different angles of inclination for the hood 13 would either be by changing the dimension B-C, and thus the length of arcuate edge 33, while holding the location of center A, or by relocating center A and thus triangle ABC would then be rotated about center point B. Of course, for different orientations of triangle ABC, the length and width of fixed hinge leaf 23 may be varied so that for a given closed hood location of pivot pin 28, center point B would be kept in the same location relative to the firebox 18. With a given distance between the pivot pins 27 and 28, the dimensions A-C and A-B would, of course, be fixed. In the preferred embodiment, the distance between pins 27 and 28 is 2½ inches. By changing the relative locations of center A, B and C, the relationship between edge 39 and the radiused return 40 will also change. For example, when the centers A and C reside in the same horizontal plane, the angle of inclination of the center of gravity of the hood 13 is approximately 34°, and the radiused return 40 resides at an elevation lower than the edge 39 of the fixed leaf 23. It will be understood that wide scope of configurations fall within the scope of the invention.

The removal of hood 13, as shown by the solid lines in FIG. 5, is undertaken when the hood 13 is generally positioned in the intermediate location. At that position, a force applied generally parallel to the tangent edge 34 slides the pin 28 upwardly therealong through gap 42 until pin 28 is free of slot means S. Removing the hood 13 would best be accomplished by two people grasping the end handles 16 and applying an upward lifting motion.

In the disclosed embodiment, the movable hinge leaf 24 comprises 3/16-inch-thick steel bar stock and the fixed hinge leaf 23 comprises seven gauge sheet steel. Accordingly, the hinge assemblies 20 and 20' are envisioned for use with heavy duty hoods, which may be in the range of from 50 to 100 pounds or more.

In the exemplary embodiment, the hood 13 is made of 16 gauge sheet steel and weighs approximately 77 pounds. The hinge assemblies 20 and 20' are spaced a few inches from the respective adjacent opposite ends of the back wall 18. Many hood shapes and styles may be used with the invention and the number, shape and size of the hinge assemblies 20 and 20' may be accordingly varied to accommodate an increase or decrease in weight, or to fit onto firebox and hood attachment surfaces that may differ from hood flat wall 19 or firebox back wall 18. With exceptionally heavy hoods, such as those might be well in excess of 100 pounds, an additional, or third, centrally located hinge assembly might be provided intermediate the assemblies 20 and 20', as shown in FIG. 2.

In order to secure the hood 13 in the open position, shown in FIG. 5, the latch arm 26 is cooperative with the pin 27 when disposed in the upper pivot and latch pin pocket 30. The latch arm 26 is rotatably secured to the fixed hinge leaf 23 by a bolt 43, spacer 44 and lock nut 45, best viewed in FIG. 6. The spacer 44 positions the latch arm 26 sidewardly of the fixed hinge leaf 23 so that it may swing in an arc to the side of the plate 25a. At the end of the latch arm 26, a rounded projection 46 extends transversely thereto and forms a latch hook portion 47 of a radius substantially the same as that of the pivot pin 27. The pivot pin 27 includes a projecting portion 48 which also extends sidewardly of the plate 25a, whereby to be presented into a plane corresponding to the plane of rotation of the latch arm 26. With respect to FIG. 6, as the latch arm 26 is rotated counterclockwise, hook portion 47 ultimately locks around the pivot pin 27. Thereby, unintended rotation of the hood 13 out of the open position is prevented. Both the assemblies 20 and 20' are preferably provided with the latching arm arrangement.

The affixation of the fixed leaf 23 to the back wall 18 is, in one embodiment, achieved by means of weld 49, as shown in FIGS. 5 and 7. An alternate manner of affixation is provided by a bracket-arm 50 being integrally formed with the hinge leaf 23 and secured to the back-wall 18 by means of a bolt 51 extending through the back wall 18 and bracket 50. This bolted arrangement is shown in FIGS. 2 and 8.

It will be seen that the plates 25a and 25b of the movable hinge leaf 24 have a generally rectangular shape adjacent the pivot pins 27 and 28. Generally upwardly from the pivot pin 27, inward straight edges 52 extend to reside against the flat portion 19 at the back of the domed hood 13. Opposite the edges 52, curved edges 54 generally conform to the curvature of the hood, as can be seen in FIG. 3, and reduce the width of the plates 25a and 25b to radiused tips 53. The staight edges 52 are, in preferred form, weld-engaged to the flat portion 19 of the hood 13 from generally opposite the the pin 27 upwardly to the tips 53. For the purposes of rigidity, the interior side of the flat portion 19 may be provided with a welded bar 55 running the full length of the hood 13, so that the relatively thinner gauge hood 13 is reinforced. The bar 55 also serves as aid in closing and sealing the hood 13 onto the horizontal flange 21 of the back wall 18. Similar reinforcing bars may be provided along the other three sides of the domed hood.

It will be understood that the inventive hinge assembly may be utilized with a wide variety of hood designs and firebox shapes and the fixed and movable hinge leaves are not be construed as being limited to the specific configurations illustrated herein. As a result, the claims appended hereto are considered to have a broad scope of equivalents.

What is claimed is:

1. A combined hood support and hinge assembly for hingedly supporting the hood of an outdoor cooking device comprising: a movable hinge leaf having a pair of parallel plates being spaced apart a distance and connected therebetween by two pivot pins and capable of being attached to a hood; and, a fixed hinge leaf having means for attachment to the firebox of an outdoor cooking device and an upwardly open slot means for the receipt therein of said pivot pins, the slot means being defined by a continuous edge formed to include three pocket portions of substantially the same radius as said pivot pins, one said pocket portion being generally downwardly concave, and the other two being generally upwardly concave, wherein the latter two pocket portions are capable of rotatably supporting a different pivot pin and wherein the concave downward pocket portion provides pivot stop means for one said pivot pin while the other said pivot is pivotally supported at one of the other said pocket portions whereby to be capable of hingedly pivoting into, and supporting a hood at, an open, closed or intermediate position relative to a firebox, and wherein the movable hinge leaf is removable from the fixed hinge leaf for removal of a hood from a cooking device.

2. A hinge assembly as claimed in claim 1 wherein the centers of said pocket portions are arranged at the corners of an imaginary isosceles triangle.

3. A hinge assembly as claimed in claim 1 wherein said fixed hinge leaf includes latch means for locking one of said pivot pins from movement out of a pocket portion to facilitate locking a hood in the open position.

4. A hinge assembly as claimed in claim 3 wherein said pivot pins comprise an upper and a lower pivot pin, one said pivot pin including a leaf-sideward extending portion, wherein said latch means is arranged to swing in a plane sidewardly of said fixed hinge leaf to be capable of engaging the leaf-sideward extending portion of said one pivot pin.

5. A hinge assembly as claimed in claim 1 wherein the continuous edge slot means defines a space of a size capable of facilitating an upward removal of said pivot pins from said fixed hinge leaf.

6. A hinge assembly as claimed in claim 1 wherein the generally concave downward pocket portion and one of said upwardly concave pocket portions are joined by an arcuate portion of said continuous edge, said arcuate portion being centered at the center of the other said upwardly concave pocket portion.

7. A hinge assembly as claimed in claim 1 wherein said pivot pins extend through said parallel plates.

8. In combination, an outdoor cooking device having a firebox formed with generally upstanding wall portions and a removable hood capable of being arranged to close over said firebox, at least one combined hood support and hinge assembly for hingedly supporting the hood and being arranged along a wall of said firebox, said hinge assembly comprising a movable hinge leaf comprised of two parallel plates secured therebetween by an upper and a lower pivot pin, said plates having edge means thereof being secured to said hood, a fixed hinge leaf attached to the wall of the firebox in vertical positional correspondence with a space defined between said parallel plates of the movable hinge leaf, said fixed hinge leaf having an upwardly open continuous edge slot means forming three pocket portions, a first and second pocket portion being generally upwardly concave and joined therebetween by a generally straight portion of said continuous edge, said first pocket capable of pivotably supporting the upper pin and the second pocket portion capable of pivotably supporting the lower pin, the third pocket portion being generally downwardly concave and capable of receiving said lower pin portion upon the disposition of the upper pin at said first pocket portion, and thereby disposing the hood to be open with respect to the firebox, said hinge assembly being capable of rotating said lower pin portion from said third pocket downwardly in an arc centered at said first pocket portion by means of said upper pin pivoting at said first pocket portion whereby to dispose said lower pin at said second pocket portion and thereby intermediately positioning the hood closer to closing over said firebox, and whereupon rotating said movable hinge leaf around said lower pin disposed in said second pocket portion said upper pin is rotatable about the center of said second pocket portion to achieve a generally vertical position above said lower pivot pin and thereby closing said hood over said firebox, and wherein for said open hood position and downwardly concave third pocket portion acting as a pivot stop for said lower pin while said upper pivot pin pivotally rests in said first pocket portion whereby an imaginary line passing through the center of gravity of said hood and the center of said first pocket is at an angle with respect to the vertical direction.

9. A hinge assembly as claimed in claim 8 wherein the centers of said pocket portions are arranged at the corners of an imaginary isosceles triangle.

10. A hinge assembly as claimed in claim 8 wherein said fixed hinge leaf includes latch means for locking one of said pivot pins from movement out of a pocket portion to facilitate locking the hood in the open position.

11. A hinge assembly as claimed in claim 10 wherein one of said pivot pins includes a leaf-sideward extending portion wherein said latch means is arranged to swing in a plane sidewardly of said fixed hinge leaf to be capable of engaging the leaf-sideward extending portion of said one pivot pin.

12. A hinge assembly as claimed in claim 8 wherein the continuous edge slot means defines a space of a size capable of facilitating an upward removal of said pivot pins from said fixed hinge leaf.

13. A hinge assembly as claimed in claim 8 wherein the downwardly concave third pocket portion and said upwardly concave second pocket portion are joined by an arcuate portion of said continuous edge, said arcuate portion being centered at the center of said upwardly concave first pocket portion.

14. A hinge assembly as claimed in claim 8 wherein said pivot pins extend through said parallel plates.

* * * * *